(12) United States Patent
Friend et al.

(10) Patent No.: US 9,618,348 B1
(45) Date of Patent: Apr. 11, 2017

(54) SPOTTING LOCATION SYSTEM OF A LOADING MACHINE

(71) Applicant: Caterpillar Inc., Peoria, IL (US)

(72) Inventors: Paul Russell Friend, Morton, IL (US); Qi Chen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/966,069

(22) Filed: Dec. 11, 2015

(51) Int. Cl.
*G06F 7/70* (2006.01)
*G01C 21/34* (2006.01)
*E02F 3/30* (2006.01)

(52) U.S. Cl.
CPC .......... *G01C 21/3407* (2013.01); *E02F 3/308* (2013.01)

(58) Field of Classification Search
CPC .................................. G01C 21/34; E02F 3/30
USPC ............................................. 701/50; 37/443
See application file for complete search history.

(56) References Cited

U.S. PATENT DOCUMENTS

| 8,583,361 | B2 | 11/2013 | Lewis et al. | |
| 9,454,147 | B1* | 9/2016 | Friend | E02F 9/2045 |
| 2016/0076228 | A1* | 3/2016 | Nau | E02F 9/261 |
| | | | | 701/50 |
| 2016/0145827 | A1* | 5/2016 | Kami | E02F 3/437 |
| | | | | 701/50 |
| 2016/0251835 | A1* | 9/2016 | Kitajima | E02F 3/3663 |
| | | | | 701/50 |

\* cited by examiner

*Primary Examiner* — Thomas G Black
*Assistant Examiner* — Luke Huynh
(74) *Attorney, Agent, or Firm* — Miller, Matthias & Hull

(57) ABSTRACT

A loading machine may include a position sensor associated with a bucket. The position sensor may be configured to generate position and orientation data of the bucket. The loading machine may also include a computer including a spotting location module in communication with, at least, the position sensor. The spotting location module may be configured to: receive the position and orientation data of the bucket generated by the position sensor; determine a spot point based on the received position and orientation data of the bucket; store the spot point; and associate the stored spot point with a subsequent location when the loading machine relocates.

20 Claims, 4 Drawing Sheets

SPOTTING LOCATION SYSTEM OF A LOADING MACHINE

TECHNICAL FIELD

The present disclosure relates generally to spotting location systems and, more particularly, relates to systems and methods for providing spotting locations from a loading machine.

BACKGROUND

At some work sites such as, but not limited to, mining, earthmoving, industrial, and agricultural sites, a work machine may be required to be positioned in a particular target location relative to a loading machine. For example, the work machine may be a haul truck that needs to be positioned close to the loading machine, which may be, but is not limited to, shovels or excavators, in order to receive a load from the bucket of the loading machine. Traditionally, the work machine may be spotted at the target location relative to the loading machine by various techniques such as manually spotting by eyesight or looking at tire track paths left by previous work machines. Efforts have been made to improve upon such traditional techniques such as using the bucket location of the loading machine to set the target location. When the loading machine moves, however, an operator of the loading machine may have to reposition the bucket and set a new target location.

U.S. Pat. No. 8,583,361 (the '361 patent) discloses a system and method for providing guidance maneuvering assistance to heavy equipment operators in proximity with other heavy equipment, hazards, or geographical features. The system of the '361 patent includes establishing a target location around a shovel. While effective, the established target location of the '361 patent may only be valid as long as the shovel remains unmoved such that when the shovel moves locations, the establish target location immediately becomes invalid and would have to be reestablished by the shovel operator.

SUMMARY

In accordance with an aspect of the disclosure, a system for providing spotting locations, determined on-board a loading machine, to a work machine is provided. The system may include a loading machine in wireless communication with a work machine. The loading machine may include a bucket associated with a position sensor. The position sensor may be configured to generate position and orientation data of the bucket. The system may also include a computer disposed on-board the loading machine. The computer may include a spotting location module in communication with, at least, the position sensor and the work machine. The spotting location module may be configured to execute instructions for: receiving the position and orientation data of the bucket generated from the position sensor; determining a spot point based on the received position and orientation data of the bucket; storing the spot point; communicating the spot point to the work machine; associating the stored spot point with a subsequent location when the loading machine relocates; and communicating the stored spot point to the work machine.

In accordance with another aspect of the disclosure, a loading machine is provided. The loading machine may include a position sensor associated with a bucket. The position sensor may be configured to generate position and orientation data of the bucket. The loading machine may also include a computer including a spotting location module in communication with, at least, the position sensor. The spotting location module may be configured to: receive the position and orientation data of the bucket generated by the position sensor; determine a spot point based on the received position and orientation data of the bucket; store the spot point; and associate the stored spot point with a subsequent location when the loading machine relocates.

In accordance with yet another aspect of the disclosure, a sample sequence of steps which may be performed for providing spotting locations from a loading machine to a work machine is provided. The sample sequence may include the step of receiving position and orientation data of a bucket of the loading machine. Another step may be electronically determining a spot point based on the position and orientation data of the bucket. Yet another step may be electronically storing the spot point. A further step may be wirelessly communicating the stored spot point to the work machine. Yet a further step may be electronically determining whether the loading machine changed locations. An even further step may be electronically associating the stored spot point with a subsequent location when the loading machine relocates. Yet an even further step may be wirelessly communicating the stored spot point associated with the subsequent location to the work machine.

DETAILED DESCRIPTION

Figure 1:
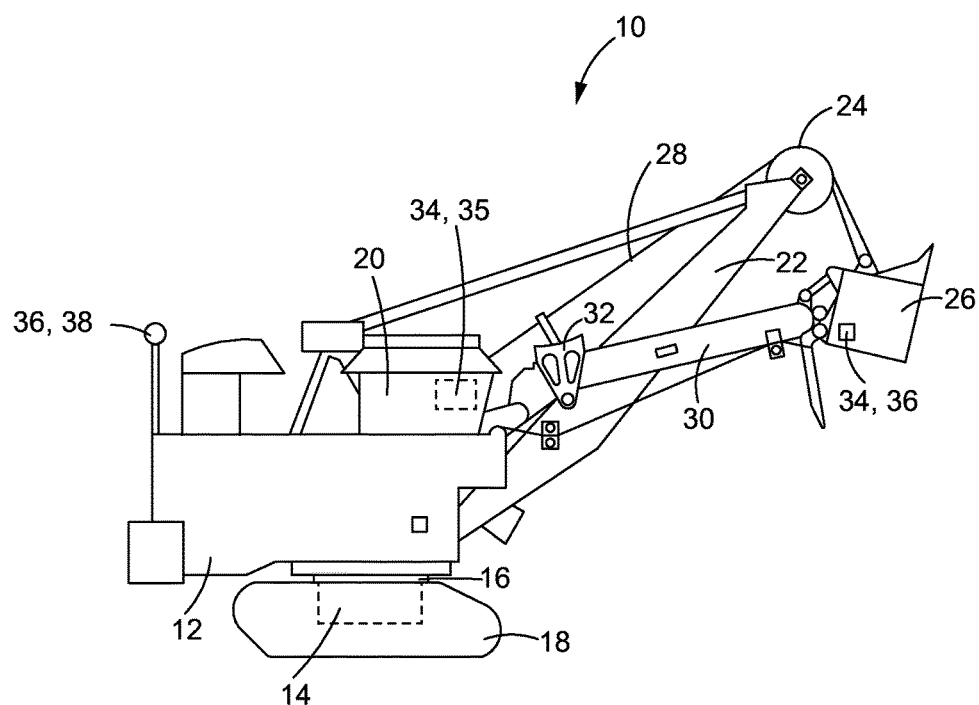
FIG. 1 is a side view of an exemplary loading machine, in accordance with an embodiment of the present disclosure.

Referring now to FIG. 1, an exemplary loading machine constructed in accordance with the present disclosure is generally referred to by reference numeral 10. While the loading machine 10 is illustrated as a shovel, it is to be understood that the loading machine may be any type of loading machine well known in the mining, earthmoving, industrial, and agricultural industries such as, but not limited to, excavators, electric shovels, electric rope shovels, power shovels, and the like. The loading machine 10 may include a body 12 that is rotationally coupled to a base 14 via a rotational bearing 16. The base 14 may include a plurality of ground engaging elements 18 such as, but not limited to, tracks or tires. The body 12 may also include a cab 20 from which an operator may control the loading machine 10.

A boom 22 may be coupled, either in a fixed or hinged manner, to the body 12. A pulley 24 may be operatively mounted to a distal end of the boom 22. A bucket 26 may be operatively suspended from the boom 22 by a cable 28 that extends over the pulley 24. Further, an arm 30 may be secured to the bucket 26 and may be supported by an arm mechanism 32 for controlling movement of the arm 30.

The loading machine 10 may include an on-board computer 34, which may be disposed in the cab 20. A spotting location module 35 of the computer 34 may receive position and orientation data from a plurality of position sensors 36. The plurality of position sensors 36 may positioning system sensors such as, but not limited to, Global Positioning System (GPS) receivers, ranging radios, and perception sensors, for example, such as radar, LIDAR, stereo cameras, and mono-cameras. The spotting location module 35 may be configured to determine the position and orientation of the bucket 26 from the data received from the plurality of position sensors 36, as well as the position and orientation of the loading machine 10. Although the plurality of position sensors 36 may be arranged in various locations throughout the loading machine 10, as a non-limiting example, a first position sensor 38 of the plurality of position sensors 36 may be disposed on the body 12 such that the first position sensor 38 generates position and orientation data about the position of the loading machine 10. As another non-limiting example, a second position sensor 40 of the plurality of position sensors 36 may be disposed on the bucket 26 such that the second position sensor 40 generates position and orientation data about the position of the bucket 26.

Figure 2:
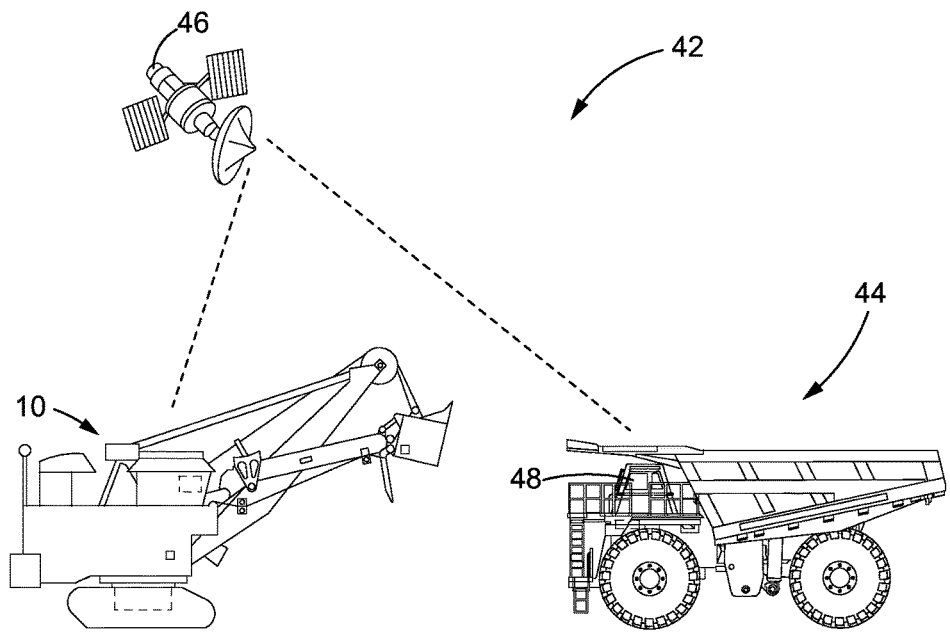
FIG. 2 is a schematic diagram illustrating an exemplary system, in accordance with an embodiment of the present disclosure.

With reference to FIG. 2, the loading machine 10 may be part of system 42, which may also include a plurality of work machines 44 (only one illustrated in FIG. 2), such that each work machine of the plurality of work machines 44 may wirelessly communicate with the loading machine 10 via a network 46, as illustrated by dotted lines. While each work machine of the plurality of work machines 44 is illustrated as a large mining truck, it is to be understood that each work machine of the plurality of work machines 44 may be any other hauling machine well known in the mining, earthmoving, industrial, and agricultural industries. The network 46 may be any non-wired network such as, but not limited to, the Internet, a WLAN, a WAN, a personal network, or any other network for connecting the computer 34 of the loading machine 10 with any computer 48 on-board each of the work machines of the plurality of work machines 44. As such, the loading machine 10 may wirelessly communicate positioning and orientation data from the plurality of position sensors 36 to each work machine of the plurality of work machines 44.

Figure 3:
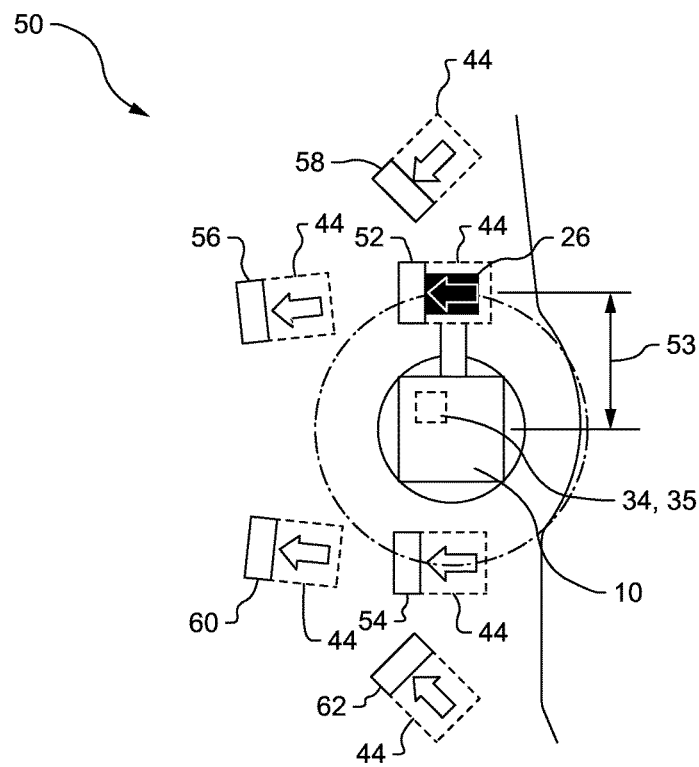
FIG. 3 is a pictorial illustration of an exemplary worksite at which the exemplary system of FIG. 2 may be implemented, in accordance with an embodiment of the present disclosure.
Figure 4:
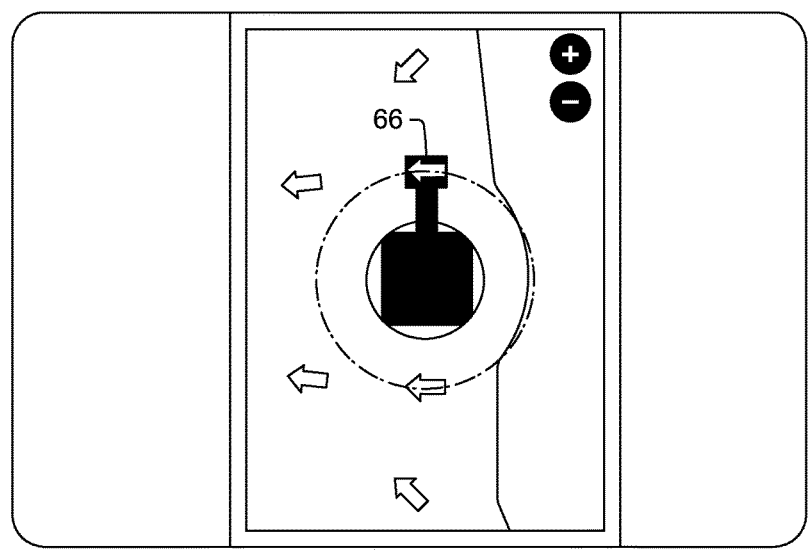
FIG. 4 is a pictorial illustration of a touch screen display, in accordance with an embodiment of the present disclosure.

Turning to the pictorial illustration of an exemplary worksite 50 in FIG. 3, the spotting location module 35 may be configured to determine a first spot point 52 based on a loading radius 53 that is determined by the position and orientation of the bucket 26. As such, the first spot point 52, being based on the loading radius 53, may be associated to a corresponding physical location that is positioned by such a distance away from the loading machine 10 and underneath the bucket 26 such that a work machine 44 may be positioned at the first spot point 52 to receive a load from the bucket 26. Further, the spotting location module 35 may be configured to receive position and orientation adjustments to the first spot point 52 prior to the first spot point 52 being verified and communicated to a work machine 44. Once the first spot point 52 is verified, the first spot point 52 may be communicated to a work machine 44 so that the work machine 44 may be positioned at the first spot point 52 to receive the load from the bucket 26.

The spotting location module 35 may be configured to set and store the first spot point 52 as the loading radius 53 distance away from the loading machine 10 and the orientation relative to a cardinal direction such as North. When the loading machine 10 propels to a subsequent location, the initial physical location associated with the first spot point 52, however, is no longer valid and a notification may be communicated to the work machine 44 that the initial physical location is invalid so that the work machine 44 does not travel to the initial physical location. With the loading machine 10 at the subsequent location, the spotting location module 35 may associate the stored first spot point 52 to a corresponding subsequent physical location beneath the bucket 26 based on the stored loading radius 53 distance and the stored orientation. In such a manner, the spotting location module 35 does not need to generate a new spot point, determined by the repositioning of the bucket 26, when the loading machine 10 moves from one location to another, but instead associates the stored first spot point 52 to the corresponding subsequent physical location beneath the bucket 26. Further, the spotting location module 35 may be configured to receive position and orientation adjustments to the first spot point 52 prior to the first spot point 52 being verified and communicated to the work machine 44. After the first spot point 52 is verified, the first spot point 52 may be communicated to a work machine 44 so that the work machine 44 may be positioned at the first spot point 52, associated with the corresponding subsequent physical location beneath the bucket 26, to receive the load from the bucket 26.

In a similar manner as described above, the spotting location module 35 may be configured to determine a second spot point 54 and similarly associate the second spot point 54 to a subsequent corresponding physical location when the loading machine 10 propels to a subsequent location. The second spot point 54 may be oppositely positioned, across the loading machine 10, from the first spot point 52.

In an embodiment, the spotting location module 35 may also be configured to determine a first call point 56 and a first queue point 58, both associated with the first spot point 52. The first call point 56 may be an appropriate location from which a work machine 44 may be positioned in order to subsequently reverse-propel to the first spot point 52. The first queue point 58 may be an appropriate location from which a first work machine 44 may be positioned and stationed until a second work machine 44 at the first spot point 52 propels to another location such that the first work machine 44 may propel to the first call point 56 and subsequently reverse-propel to the first spot point 52.

Similarly, in a further embodiment, the spotting location module 35 may also be configured to determine a second call point 60 and a second queue point 62, both associated with the second spot point 54. In similar fashion, the second call point 60 may be an appropriate location from which a work machine 44 may be positioned in order to subsequently reverse-propel to the second spot point 54. The second queue point 62 may be an appropriate location from which a first work machine 44 may be positioned and stationed until a second work machine 44 at the second spot point 54 propels to another location such that the first work machine 44 may propel to the second call point 60 and subsequently reverse-propel to the second spot point 54.

In another embodiment, the computer 34 may include a touch screen display 64 for displaying a representation of the worksite 50, which may be implemented from data provided by a mine site survey, shared terrain data, or perception systems, to name a few non-limiting examples. An operator of the loading machine 10 may select the first spot point 52 by dragging a first spot point icon 66 to a desired location on the display 64 such that the first spot point 52 is then provided to the spotting location module 35. If the first spot point icon 66 is dragged to a location that is determined to be prohibited due to terrain limitations, a notification may be displayed to notify the operator that such a location cannot be selected. Further, the spotting location module 35 may be configured to receive position and orientation adjustments to the first spot point 52 prior to the first spot point 52 being verified and communicated to a work machine 44. When the loading machine 10 propels to a subsequent location, the spotting location module 35 may, as described above, associate the stored first spot point 52 to a corresponding subsequent physical location beneath the bucket 26 based on the stored loading radius 53 distance and the stored orientation.

Figure 5:
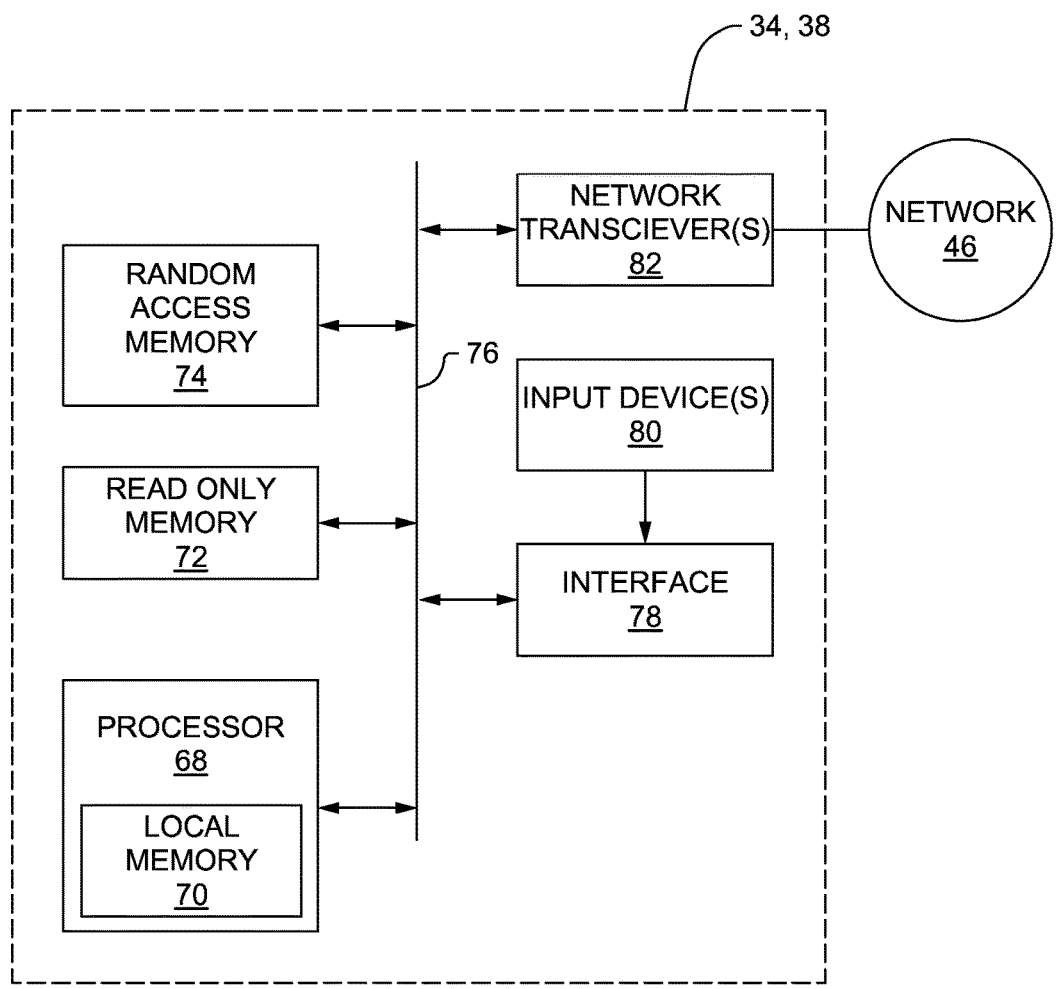
FIG. 5 is a schematic block diagram illustrating components of an exemplary computer, in accordance with an embodiment of the present disclosure.

FIG. 5 is a block diagram of example components of computers 34, 48 capable of executing instructions to realize the disclosed system and methods for providing spotting locations from the loading machine 10 to each work machine of the plurality of work machines 44, as described above and/or capable of executing instructions to perform methods discussed below in reference to FIG. 6. Computers 34, 48 may include a processor 68 that may be, for example, implemented by one or more microprocessors or controllers from any desired family or manufacturer.

The processor 68 includes a local memory 70 and is in communication with a main memory including a read only memory 72 and a random access memory 74 via a bus 76. The random access memory 74 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 72 may be implemented by a hard drive, flash memory and/or any other desired type of memory device.

The computers 34, 48 may also include an interface circuit 78. The interface circuit 78 may be implemented by any type of interface standard, such as, for example, an Ethernet interface, a universal serial bus (USB), and/or a PCI express interface. One or more input devices 80 are connected to the interface circuit 78. The input device(s) 80 permit a user to enter data and commands into the processor 68. The input device(s) 80 may be implemented by, for example, the touch screen display 64, a keyboard, a mouse, a track-pad, a trackball, and/or a voice recognition system. For example, the input device(s) 80 may include any wired or wireless device for providing input from an operator to the computers 34, 48.

Further, the computers 34, 48 may include one or more network transceivers 82 for connecting to the network 46, such as the Internet, a WLAN, a LAN, a personal network, or any other network for connecting the computer 34, 48 to one another and to one or more other computers or network capable devices.

As mentioned above the computers 34, 48 may be used to execute machine readable instructions. For example, the computers 34, 48 may execute machine readable instructions to perform the methods shown in the block diagram of FIG. 6 and described in more detail below. In such examples, the machine readable instructions comprise a program for execution by a processor such as the processor 68 shown in the example computers 34, 48. The program may be embodied in software stored on a tangible computer readable medium such as a CD-ROM, a floppy disk, a hard drive, a digital versatile disk (DVD), a Blu-ray disk, or a memory associated with the processor 68, but the entire program and/or parts thereof could alternatively be executed by a device other than the processor 68 and/or embodied in firmware or dedicated hardware. Further, although the example programs are described with reference to the block diagram illustrated in FIG. 6, many other methods of implementing embodiments of the present disclosure may alternatively be used. For example, the order of execution of the blocks may be changed, and/or some of the blocks described may be changed, eliminated, or combined.

INDUSTRIAL APPLICABILITY

In general, the present disclosure may find applicability in many industries including, but not limited to, mining, earthmoving, industrial, and agricultural industries and, more particularly, to systems and methods for providing spotting locations from a loading machine to a work machine. By utilizing the systems and methods disclosed herein, the spotting location module 35 may receive a first spot point 52 associated with an initial corresponding physical location, when the loading machine 10 is at one location, and subsequently associate the first spot point 52 with a subsequent corresponding physical location after the loading machine 10 propels and stops at a different location. Further, as part of system 42, the spotting location module 35 may communicate the first spot point 52, whether associated with the initial physical location or the subsequent physical location, to each work machine of the plurality of work machines 44 via network 46.

In operation, the spotting location module 35 may determine the first spot point 52 based on the position and orientation data of the bucket 26 received from the plurality of position sensors 36. Alternatively, the spotting location module 35 may receive the first spot point 52 via the touch screen display 64 by an operator of the loading machine 10 dragging the first spot point icon 66 to a desired location on the touch screen display 64. Prior to setting and storing the first spot point 52, the spotting location module 35 may receive and apply adjustments to the first spot point 52 to sharpen the position and orientation of the first spot point 52. With the first spot point 52 set and stored, the operator of the loading machine 10 has the option to cancel the stored first spot point 52 such that if the stored first spot point 52 is canceled, then the spotting location module 35 may communicate an invalid notification to the work machine 44 and receive a new first spot point 52. If, however, the stored first spot point 52 is not canceled, then the work machine 44 may receive the first spot point 52 from the loading machine 10 via the network 46 and may then travel to the corresponding physical location associated with the first spot point 52 in order to receive a load from the bucket 26 of the loading machine 10.

After receiving the load, the work machine 44 may travel away from the corresponding physical location associated with the first spot point 52 such that another work machine of the plurality of work machines 44 may be positioned, in some instances from the first queue point 58 to the first call point 56 and then, to the same corresponding physical location associated with the first spot point 52 to receive a load from the bucket 26 of the loading machine. Such a pattern may continue until the loading machine 10 propels to a different location at which time a notification may be communicated to the plurality of work machines 44 that the corresponding physical location associated with the first spot point 52 is invalid.

With the loading machine 10 relocated to a subsequent location, the spotting location module 35 associates the stored first spot point 52 to a corresponding subsequent physical location beneath the bucket 26. The operator of the loading machine 10 may then verify the first spot point 52 as valid such that the first spot point 52 may then be communicated to the plurality of work machines 44 via the network 46 so that a work machine of the plurality of work machines 44 may be positioned to the corresponding subsequent physical location associated with the first spot point 52 in order to receive a load from the bucket 26 of the loading machine. If, however, the stored first spot point 52 is canceled, then the spotting location module 35 may communicate an invalid notification to the work machine 44 and receive a new first spot point 52.

Figure 6:
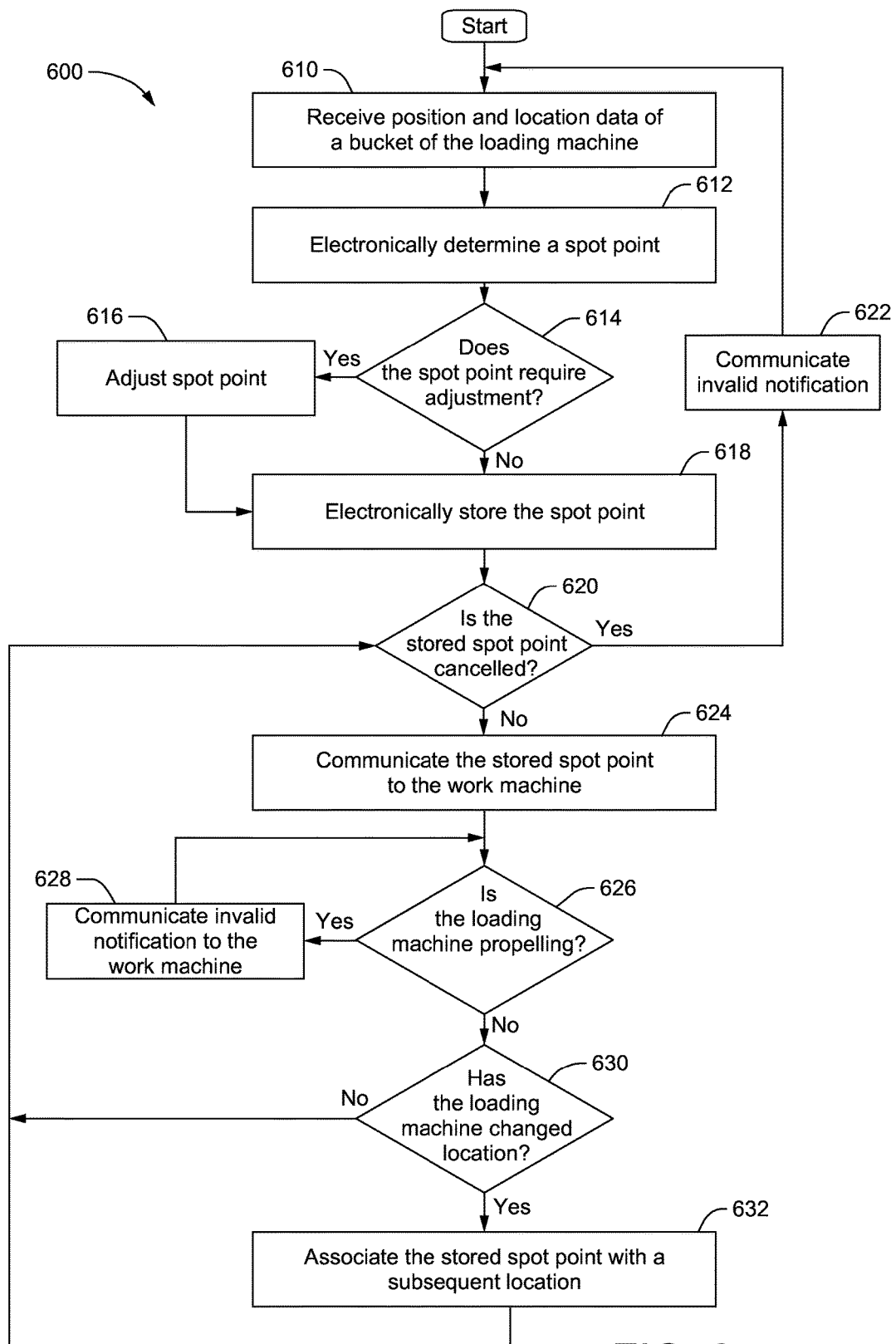
FIG. 6 is a flow chart illustrating a sample sequence of steps which may be practiced in accordance with an embodiment of the present disclosure.

FIG. 6 illustrates a flow chart 600 of a sample sequence of steps which may be performed for providing spotting locations from a loading machine 10 to a work machine 44. Box 610 illustrates the step of receiving position and orientation data of a bucket 26 of the loading machine 10 via a position sensor 36. Another step, as illustrated in box 612, may be electronically determining a spot point 52 based on the position and orientation data of the bucket 26. Determining the spot point 52 may include determining the spot point 52 based on a loading radius 53 corresponding to a position located away from the loading machine 10 and underneath the bucket 26. At decision box 614, it is determined whether the spot point requires adjustment. If the spot point requires adjustment, then the spot point is adjusted, as depicted at box 616, and electronically stored, as depicted at box 618. If the spot point 52 does not require adjustment, then the spot point 52 is electronically stored, as depicted at box 618.

At decision box 620, it is determined whether the stored spot point 52 has been canceled, for example, by an operator of the loading machine 10. If the stored spot point 52 has been canceled, then an invalid notification may be wirelessly communicated to the work machine 44, as depicted in box 622, and the step of receiving position and orientation data of the bucket 26 of the loading machine 10 via the position sensor 36, at box 610, may be repeated to determine a new spot point 52. If the stored spot point 52 has not been canceled, as illustrated at box 624, the stored spot point 52 may be wirelessly communicated to the work machine 44.

At decision box 626, it is determined whether the loading machine 10 is propelling. If the loading machine is propelling, an invalid notification is wirelessly communicated to the work machine, as depicted in box 628, and then determined again, at decision box 626, whether the loading machine 10 is propelling. If the loading machine 10 is not propelling, it is determined, at decision box 630, whether the loading machine 10 has changed locations. If the loading machine 10 has not changed locations, it is determined again whether the stored spot point 52 has been canceled, at decision box 620, such that the invalid notification may be communicated when canceled, as illustrated at box 622, or the stored spot point 52 may be communicated when not canceled, as illustrated at box 624. If the loading machine 10 has changed locations, however, then the stored spot point 52 is electronically associated with a subsequent location, as illustrated at box 632. After it is determined that the stored spot point 52 associated with the subsequent location has not been canceled, as illustrated at box 620, the stored spot point 52 associated with the subsequent location may be wirelessly communicated to the work machine 44, as illustrated at box 624. If, however, it is determined that the stored spot point 52 associated with the subsequent location has been canceled, then the invalid notification is communicated, as depicted in box 622, and the step of receiving position and orientation data of the bucket 26 of the loading machine 10 via the position sensor 36, at box 610, may be repeated to determine a new spot point 52.

What is claimed is:

1. A system for providing spotting locations, determined on-board a loading machine, to a work machine, the system comprising:
   a work machine;
   a loading machine in wireless communication with the work machine, the loading machine including a bucket associated with a position sensor, the position sensor configured to generate position and orientation data of the bucket; and
   a computer disposed on-board the loading machine, the computer including:
      a spotting location module in communication with, at least, the position sensor and the work machine, the spotting location module configured to execute instructions for:
         receiving the position and orientation data of the bucket generated from the position sensor;
         determining a spot point based on the received position and orientation data of the bucket;
         storing the spot point;
         communicating the stored spot point to the work machine;
         associating the stored spot point with a subsequent location when the loading machine relocates; and
         communicating the stored spot point to the work machine.

2. The system of claim 1, wherein the spotting location module of the computer is further configured to execute the instruction of determining the spot point based on the position and orientation data of the bucket to include determining the spot point based on a loading radius corresponding to a position located away from the loading machine and underneath the bucket.

3. The system of claim 2, wherein the spotting location module of the computer is further configured to execute the instruction of storing the spot point to include storing the spot point as the loading radius and the orientation relative to a cardinal direction.

4. The system of claim 1, wherein the spotting location module of the computer is further configured to execute the instruction of storing the spot point to include receiving and applying position and orientation adjustments to the spot point.

5. The system of claim 4, wherein the spotting location module of the computer is further configured to execute the instruction of communicating the spot point to the work machine includes wirelessly communicating the spot point to the work machine via a network.

6. The system of claim 5, wherein the spotting location module of the computer is further configured to execute instructions for communicating an invalid notification to the work machine when the loading machine begins to propel.

7. The system of claim 1, wherein the spotting location module of the computer is further configured to execute the instruction of communicating the stored spot point to the work machine includes verifying the stored spot point and wirelessly communicating the verified stored spot point to the work machine via a network.

8. A loading machine, the loading machine comprising:
   a bucket;
   a position sensor associated with the bucket, the position sensor configured to generate position and orientation data of the bucket; and
   a computer including:

a spotting location module in communication with, at least, the position sensor, the spotting location module configured to:
  receive the position and orientation data of the bucket generated by the position sensor;
  determine a spot point based on the received position and orientation data of the bucket;
  store the spot point; and
  associate the stored spot point with a subsequent location when the loading machine relocates.

9. The loading machine of claim 8, wherein the position sensor is one of a global positioning system receiver, a ranging radio, and a perception sensor.

10. The loading machine of claim 8, wherein the spotting location module of the computer is further configured to determine the spot point based on a loading radius corresponding to a position located away from the loading machine and underneath the bucket.

11. The loading machine of claim 10, wherein the spotting location module of the computer is further configured to store the spot point as the loading radius and the orientation relative to a cardinal direction.

12. The loading machine of claim 8, wherein the spotting location module of the computer is further configured to receive and apply position and orientation adjustments to the spot point.

13. The loading machine of claim 8, wherein the spotting location module of the computer is further configured to communicate an invalid notification when the loading machine begins to propel.

14. The loading machine of claim 8, wherein the spotting location module of the computer is further configured to associate the stored spot point with the subsequent location when the loading machine relocates includes verifying the stored spot point.

15. The loading machine of claim 14, wherein the spotting location module of the computer is further configured to communicate the verified stored spot point.

16. The loading machine of claim 15, wherein the spotting location module of the computer is further configured to communicate the verified stored spot point to a work machine via a network.

17. The loading machine of claim 8, wherein the loading machine is one of a shovel, an excavator, an electric shovel, an electric rope shovel, and a power shovel.

18. A method for providing spotting locations from a loading machine to a work machine, the method comprising:
  receiving position and orientation data of a bucket of the loading machine;
  electronically determining a spot point based on the position and orientation data of the bucket;
  electronically storing the spot point;
  wirelessly communicating the stored spot point to the work machine;
  electronically determining whether the loading machine changed location;
  electronically associating the stored spot point with a subsequent location when the loading machine relocates; and
  wirelessly communicating the stored spot point associated with the subsequent location to the work machine.

19. The method of claim 18, wherein electronically determining a spot point based on the position and orientation data of the bucket includes determining whether the spot point requires adjustment.

20. The method of claim 18, further including determine whether the loading machine is propelling and communicating an invalid notification to the work machine when it is determined that the loading machine is propelling.

* * * * *